Patented Dec. 7, 1943

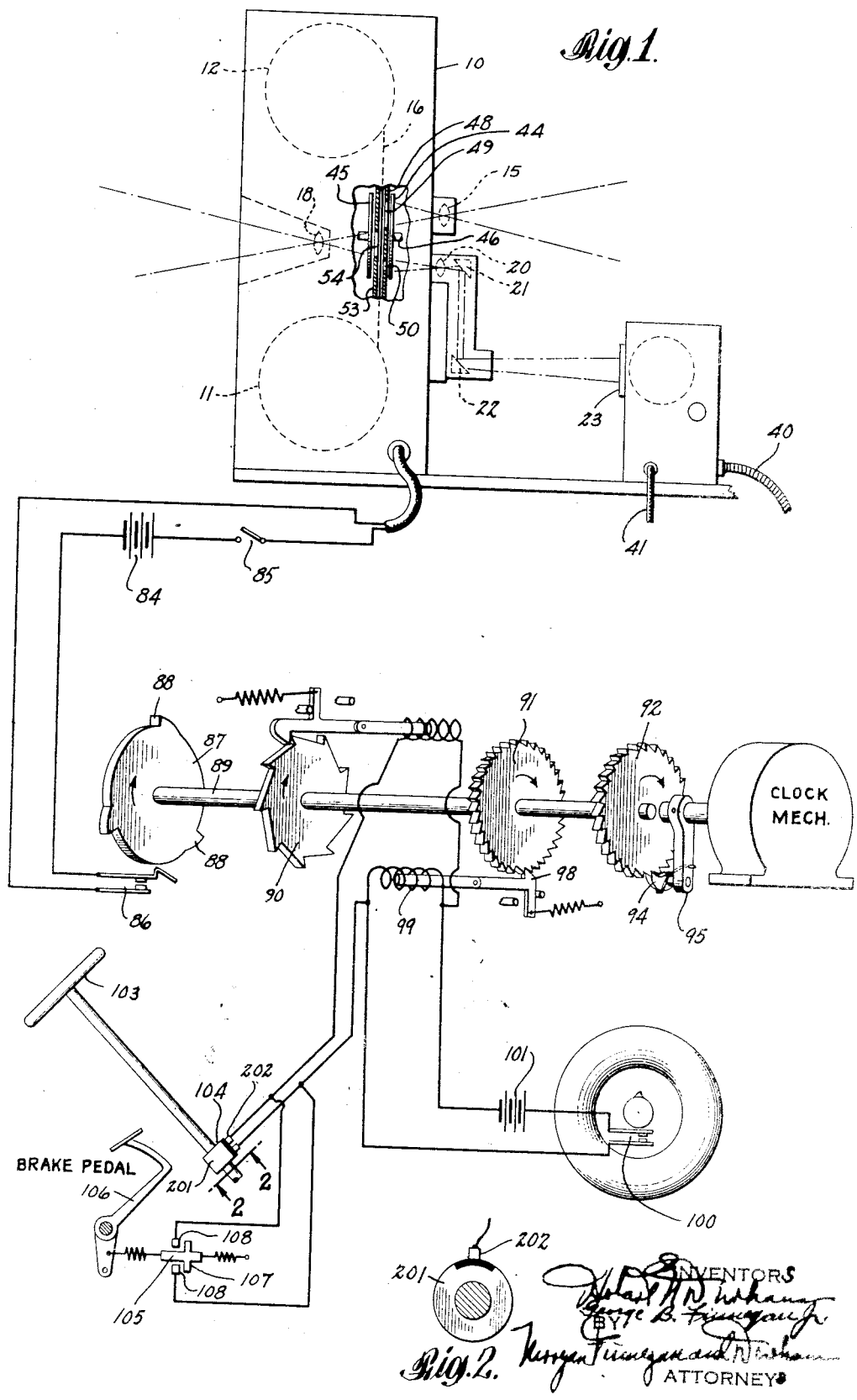

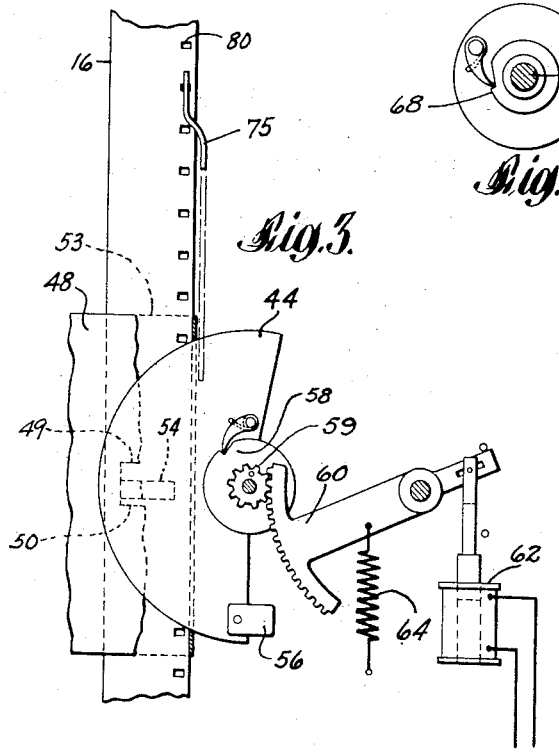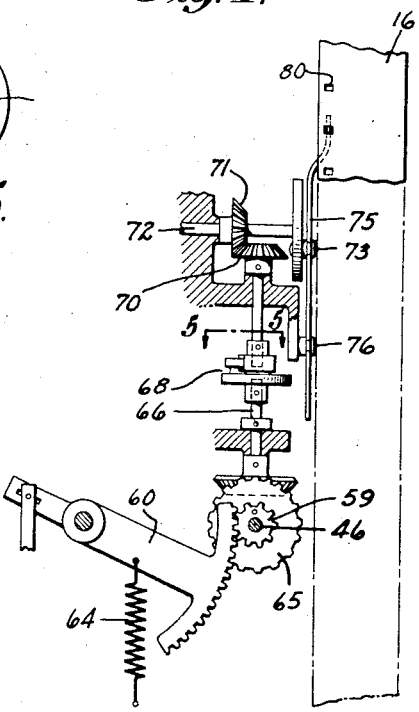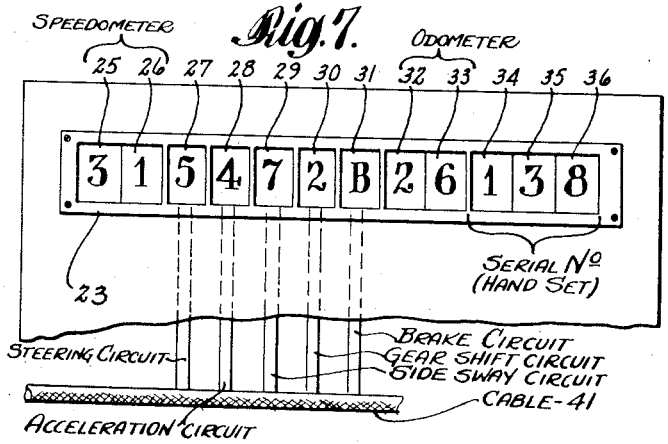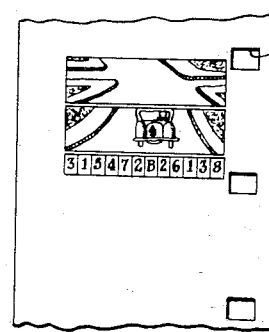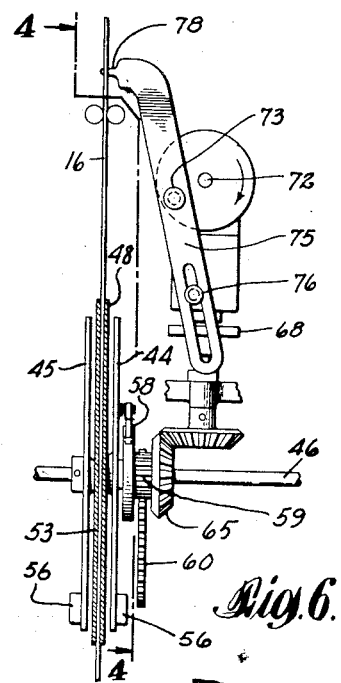

2,336,081

UNITED STATES PATENT OFFICE 2,336,081

RECORDING CAMERA

George B. Finnegan, Jr., Mountain Lakes, N. J., and Hobart N. Durham, Munsey Park, N. Y.

Application May 5, 1938, Serial No. 206,120

3 Claims. (Cl. 234—60)

The present invention relates to photographic cameras and more particularly to a novel and improved camera and control therefor adapted to make a photographic record of the manner in which a motor vehicle is operated on the highway.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a schematic view showing an illustrative embodiment of the present invention;

Figure 2 is a fragmentary detailed view taken on the line 2—2 of Fig. 1;

Figure 3 is a front view of the camera shutter, film feed and actuating mechanism;

Figure 4 is a sectional view, taken on the line 4—4 of Figure 6;

Figure 5 is a detailed sectional view taken on the line 5—5 of Figure 4;

Figure 6 is a detailed, side elevation of the parts shown in Figure 3;

Figure 7 is a fragmentary rear elevation of the instrument panel; and

Figure 8 is a view showing a single record picture taken by the illustrative apparatus.

The present invention has for its object the provision of a novel and improved camera for automatically and economically recording the manner in which a motor vehicle is operated. A further object is the provision of a camera which takes a series of photographs at periodic intervals while the vehicle is running normally, and at more frequent intervals at critical periods in the operation of the vehicle, the intervals preferably being such that the images of the roadway overlap and give a continuous record of the roadway. The invention also provides a simple and economical means and method of collecting data from which an analysis may be made of the driver's driving habits and tendencies, so that they may be corrected and the driver may be helped to drive more safely. The invention is particularly useful in connection with the operation of commercial vehicles where human "spotters" are now employed to follow the vehicles, observe and report on their manner of operation, the invention providing a continuous record which obviates the need for such "spotters."

In the illustrative embodiment of the invention there is provided a camera adapted to be positioned and so constructed as to take a picture showing the roadway to the front of the moving vehicle and also, preferably, to the rear of the vehicle. The camera is also preferably adapted to record on the film a contemporary record of the operating conditions of the vehicle such as speed, steering, braking, etc. The record pictures are preferably taken upon relatively narrow film, such as 8 or 16 mm. film and are taken at intervals corresponding to definite road distances or intervals of time. Thus, for example, a record picture is taken once every 20 to 40 seconds by clock-controlled means, once every 300 to 500 feet of vehicle travel by speed or distance controlled means and once every 40 to 100 feet while the brake is applied or the vehicle is being steered to the right or left. In the latter cases the camera shutter is actuated at the desired frequency by means put in operation during application of the brake and/or steering wheel and similarly the shutter is actuated in the other cases by means responsive to a clock movement and to the speed or distance responsive mechanism. The various times and distances given are suggestive of the relative frequencies of picture taking under various conditions of vehicle operation but are not to be considered as limiting the invention to any specific ratios between picture taking frequencies under such different conditions. That is, when the vehicle is traveling on a normal and fairly straight course, the intervals between exposures are relatively long, but sufficient to give the desired overlap on successive images, while on curved routes and in circumstances where the driving conditions are more critical, a more frequent pictorial record is made. Each record picture preferably comprises three images in juxtaposition; the forward road picture, the rearward road picture and the instrument image showing speed, braking, steering, etc. Among other things, the record pictures will show the position of the vehicle in relation to other vehicles and objects on the roadway; the tendencies of the driver as to driving near the center or side of the road; his speed and position on approaching crossings and making turns; his actions in applying the brake under various circumstances, etc. Thus an accurate analysis of the driver's habits and actions can be made through a continuous automatic record thereof.

Referring now in detail to the illustrative embodiment of the invention as shown in the accompanying drawings, the camera comprises a light-tight box 10 in which are mounted the film spool 11 and the take-up spool 12. A lens 15 is provided at the front of the camera and projects its image upon the front side of the film 16 while a similar lens 18 is provided to the rear of the camera and projects the rear image upon the back side of the film 16 and just below the front image. A third lens 20 is provided for the instrument image and in order to allow more convenient placing of the lens 20 and instrument panel 23, prisms 21 and 22 are provided to reflect the instruments into the lens field.

Figure 7 shows the instrument panel as it appears to the lens 20 and the several drums 25 to 36 register the various factors in vehicle operation. Thus, drums 25 and 26 may show miles per hour, drum 27 may show the steering course in arbitrary units, drum 28 shows positive or negative acceleration in arbitrary units, drum 29 shows side sway or excessive speed around curves in arbitrary units, drum 30 shows the gear in which the vehicle is being driven, drum 31 shows whether or not the brake is applied, drums 32 and 33 show mileage in tenths or hundredths of a mile and drums 34, 35 and 36 show a serial number to identify the record. These drums may be controlled in any desired manner, as by a speedometer shaft 40 and electrical cable 41 suitably connected for operation by the various parts of the vehicle. That is, drums 25 and 26 may be conventional speedometer dials; drum 27 may be a magnetically positioned dial rotatable in direction and amount corresponding to the turning of the steering wheel. Drum 28 may be an electrically operated dial responsive to a circuit in which the voltage or current is proportional to the acceleration and deceleration of the vehicle and the direction of the current responsive to the sense of the movement. Drum 29 may be an electrically controlled indicating dial controlled by a circuit which is responsive to the deviations of the upright axis of the vehicle from the vertical (for side sway) or responsive to centrifugal force (for showing speed around curves). Drum 30 may be an electrically positionable indicating drum whose position is controlled by a circuit having switches correlated with the gear shifting mechanism. Drum 31 may be a simple two position member moved to show the position "B" by a circuit closed when the brake is on and returned to a blank indicating position when the brake is off; or the drum 31 may be stationary with the letter "B" formed of translucent material which is illuminated by an electric lamp behind it when the circuit is closed upon actuation of the brake. Drums 32 and 33 may be actuated by the usual odometer mechanism from the speedometer shaft 40. The drums 34, 35 and 36 are preferably hand set and locked or semi-permanently positioned to give a number corresponding to the particular vehicle, camera or operator being tested. In Fig. 7 appropriate legends are applied to indicate the several components of the electrical cable 41 as hereinabove described. The instrument panel 23 is positioned in front of the camera with the indicia visible through the prisms 21 and 22 and the lens 20, so that it forms a narrow image across the width of the film. While the many divers indicia here shown and described are desirable, all of them may not be essential in practice, as frequently a showing and recording of speed, braking and perhaps steering, would be adequate for the analytic record desired.

Means are provided for feeding and exposing the film within the camera and for this purpose there is provided a double, rotary, segmental shutter having its opaque segments 44 and 45 mounted on opposite sides of the film by means of the rotatable shaft 46, and between each of the segments and the film is a mask defining the proper exposure area for the lens controlled by that shutter. As embodied, mask 48 is provided with a rectangular aperture 49 for the forward road image and with a narrow rectangular aperture 50 for the instrument image, while the mask 53 is provided with a rectangular aperture 54 for the rear road image, and aperture 54 is positioned in between the apertures 49 and 50, but on the other side of the film.

Shutters 44 and 45 are weighted by weights 56 so that they normally remain in non-exposing position, but may be moved for exposure by means of the one way clutch 58 carrying pinion 59 which meshes with the segmental gear 60 oscillated by solenoid 62 against the tension of spring 64, and the exposure takes place on the return movement of the segment 60. As the segment returns, the shaft 46 is rotated and the segmental shutters 44 and 45 rotate therewith to expose the film in a known manner.

Means are provided for feeding the film 16 as the segment 60 is moved by the solenoid 62 and just before the exposure and for this purpose shaft 46 carries a bevel gear 65 meshing with another bevel gear on shaft 66 which is connected to the driving side of the one-toothed ratchet or one-way clutch 68, driving bevel gear 70. Gear 70 meshes with bevel gear 71 on shaft 72 which carries the crank pin 73 on which feed pawl 75 is pivotally mounted, and the lower end of feed pawl 75 is slotted to pass over and be guided by stationary pin 76, while the upper end of the pawl is provided with a tooth 78 to enter and engage one of the feed perforations 80 in the margin of the film. Thus, as the solenoid 62 is energized, the film is fed upwardly one frame, after which the shutter is revolved a full revolution so as to expose the front and back of the film to the images formed by lenses 15, 18 and 20.

The frequency of the exposures are automatically controlled during the operation of the vehicle by means of the control mechanism shown in Figure 1 of the drawings and the solenoid 62 receives its power from the battery 84 whenever switches 85 and 86 are closed. Switch 85 may be the ignition switch for the vehicle engine, while switch 86 is automatically controlled by the running and operation of the vehicle.

As shown, switch 86 is adapted to be closed by the lobes 88 on cam 87 carried and rotated by shaft 89. Shaft 89 also carries the ratchet wheels 90, 91 and 92 having different numbers of teeth and these ratchet wheels are driven by different members so that the intervals between exposures are controlled by a combination of factors. Ratchet wheel 92 cooperates with the pawl 94 on clock driven arm 95 making a revolution every two minutes, for example, and thereby causing a record picture to be taken once every forty seconds while the vehicle engine is running. Ratchet 91 is provided with a larger number of teeth than the clock driven ratchet 92 and is driven by means of the pawl 98 actuated by solenoid 99 which is energized once each revolution of the vehicle wheels through switch 100 from battery 101, thereby providing means for causing the shutters 44 and 45 to rotate for exposures more frequently than every forty seconds whenever the vehicle is moving. As stated the frequency of shutter operation by this means is preferably at a rate of say 300 feet of vehicle travel, so that whenever the vehicle is moving at a speed even as slow as 10 M. P. H. the picture-taking rate would be more frequent than that determined by the clock mechanism. Ratchet wheel 90 is adapted to be moved ahead once each wheel revolution whenever the brake operated switch 105 or steering operated switch 104 is closed, and as ratchet wheel 90 has only one-third the number of teeth of the ratchet 91, the pictures are then taken three times as frequently as when the vehicle is travelling on a straight course and/or without application of the brake.

Switch 104 is closed whenever the steering wheel 103 is turned to the right or left more than a small amount, such as one-sixth revolution, and for this purpose the conducting member 201 is driven by the steering wheel and is adapted to bridge the contacts 202. Brake pedal 106 operates switch 105 which is shunted with reference to the switch 104, and when the brake pedal is depressed, the bridging member 107 contacts with the switch points 108, and with this switch closed the ratchet 90 is similarly moved ahead one tooth each wheel revolution.

Thus, the record pictures are taken once each, say three hundred feet of vehicle travel during normal operation of the vehicle, and whenever the vehicle is turning or being braked, the record pictures are taken several times as frequently. Also, if the vehicle is traveling very slowly, or is stopped in traffic, the record pictures are taken after a predetermined period of time. At all times, the record pictures are taken sufficiently close together that they show the entire road travelled and each picture shows beyond the point at which the next record picture begins. However, not more than a maximum of 20 to 25 record pictures per mile are generally needed for normal driving, and the cost of film for this purpose is economically feasible.

It will be understood that the actuations of the camera by the several controls or actuating devices occur independently of each other. That is, the rotation of the shaft 89 by the clock mechanism takes place continually so that a picture will be taken once every 40 seconds (if that is the time interval), regardless of how much more frequently pictures may be taken by virtue of the operations of the other controls. When the vehicle is travelling so fast that the shutter actuation from the turning of the vehicle wheels occurs more frequently than once each 40 seconds, the rotations of shaft 89 from ratchet wheel 91 will cause the shaft to overrun the speed of operation imposed by the clock mechanism so that pictures may be taken say every three and one-half seconds because of the vehicle speed. Nevertheless the turning of shaft 89 will be continued to be influenced by the clock mechanism also so that pictures will also be taken regularly every 40 seconds because of it. In a similar manner when the brake is applied or the steering wheel is turned, a still higher rate of picture taking will be imposed on or added to the turning of the shaft through ratchet wheel 90. For example, assuming that the clock mechanism turns shaft 89 to take a picture every 40 seconds, the ratchet wheel 91 is geared to take a picture every 300 feet, and ratchet wheel 90 every 100 feet and assume that the vehicle is travelling 60 miles per hour. We would then have a picture taken every 40 seconds by virtue of the clock mechanism, a picture taken approximately every three and one-half seconds by virtue of the vehicle speed and in turning corners at that speed additional pictures taken approximately every second by virtue of the steering wheel controlled ratchet 90. These separately actuated pictures or exposures might in some cases occur simultaneously or at intervals having no uniform relation to each other, but that would not alter the independent but superimposed periods of actuation as described.

After the pictures have been taken and developed, the length of film, corresponding to the day's run, can be projected, and the person reviewing the film has the opportunity to study and judge the characteristics of the driver, and determine what points in his driving should be improved or corrected.

The camera and its controls may also be used for making an evidentiary record of the conditions obtaining during the trip so that in case of an accident, the responsibility can be better determined, for in practically every accident the brake would be applied or the vehicle would be steered and thus a record would be made of all of the operating conditions at the time of the accident.

If desired, and in many cases it will be found feasible, the record of the instrument panel and/or the record of the rear road scene may be dispensed with, and reliance placed solely upon the vehicle controlled recording of the road scene ahead of the vehicle. From such a record picture, the angle of steering, and the distance between pictures can be judged roughly, as well as the braking, so that a record sufficient for many purposes will be obtained. Also, the separate lens 20 may be dispensed with and the instrument panel included in the field of view of the main lens 15, if desired, by suitable positioning of the instrument panel. This may be done merely by spacing the panel 23 a sufficient distance from the camera so that the panel will be included within the field of view of the lens 15, as will be obvious from Fig. 1.

The camera or cameras may be mounted on any suitable part of the vehicle where the desired views may best be obtained. In practice the camera is preferably positioned on or near the roof of the car to obtain the best unobstructed view of the road.

The invention in its broader aspects is not limited to the specific mechanisms shown and described but departures may be made therefrom within the scope of the accompanying claims without departing from the principles of the invention and without sacrificing its chief advantages.

What we claim is:

1. A device for photographically recording operations of a road vehicle including in combination a strip film camera for taking successive photographs of a roadway while the camera is mounted on the vehicle, means for periodically actuating the camera in accordance with the travel of the vehicle over the roadway, means controlled by the vehicle controls for causing the camera to be actuated at an accelerated rate and means for recording on the film adjacent the roadway photograph an image of indicating means representing and operated by said vehicle controls, thereby to identify the control which caused the accelerated actuation.

2. A device for photographically recording operations of a road vehicle including in combination a camera mounted on an automobile in position to photograph the roadway in advance of the automobile, means connected with the automobile for periodically making photographic exposures, the frequency of the exposures varying directly with the speed of the automobile and means controlled by a vehicle control for increasing the frequency of exposures beyond that determined by the speed of the automobile.

3. Apparatus for photographically recording operations of a motor vehicle on a roadway including in combination a strip film camera mounted in a fixed position on the vehicle to take successive photographs of the roadway on which the vehicle is travelling, means for actuating the camera and means controlled by movement of the vehicle over the roadway for taking the photographs periodically, one each time the vehicle has travelled a predetermined distance on the roadway, the frequency and the position of the camera being such that the successive photographs show overlapping portions of the roadway.

GEORGE B. FINNEGAN, Jr.
HOBART N. DURHAM.